United States Patent [19]

Hoblingre

[11] Patent Number: 4,943,182
[45] Date of Patent: Jul. 24, 1990

[54] RAPID FASTENER OF THE BAYONET TYPE

[75] Inventor: André Hoblingre, Valentigney, France

[73] Assignee: ECIA - Equipements Et Composants Pour L'Industrie Automobile, Audincourt, France

[21] Appl. No.: 323,590

[22] Filed: Mar. 14, 1989

[30] Foreign Application Priority Data

Mar. 14, 1988 [FR] France ................................. 8803290

[51] Int. Cl.⁵ ............................................. F16B 7/20
[52] U.S. Cl. ................................. 403/349; 403/325; 403/359; 403/328
[58] Field of Search ................ 403/325, 328, 349, 359

[56] References Cited

U.S. PATENT DOCUMENTS

| | | | |
|---|---|---|---|
| 2,527,256 | 10/1950 | Jackson | 403/349 X |
| 2,723,876 | 11/1955 | Langlors et al. | 403/349 X |
| 2,880,435 | 4/1959 | Deutsch et al. | 403/349 X |
| 3,280,439 | 10/1966 | McCarthy | 403/325 X |
| 3,362,050 | 1/1968 | McCarthy | 403/325 X |
| 3,390,874 | 7/1968 | McCarthy | 403/325 X |
| 3,423,781 | 1/1969 | Hensen | 403/349 |
| 3,854,832 | 12/1974 | Cowper | 403/349 |
| 3,898,012 | 8/1975 | Gillin | 403/328 X |
| 4,076,105 | 2/1978 | Aono | 403/349 X |
| 4,768,405 | 9/1988 | Nickipuck | 403/325 X |

*Primary Examiner*—Randolph A. Reese
*Assistant Examiner*—Carol I. Bordas
*Attorney, Agent, or Firm*—Sughrue, Mion, Zinn, Macpeak & Seas

[57] ABSTRACT

The rapid fastener is adapted to achieve a connection in the axial direction and in rotation of two elements and more particularly torque-transmitting shafts. It comprises at the end of one of the elements a socket (8) which is provided with at least one helical slot (14, 16) and on which is axially slidable a ring (18) defining at least one longitudinal slot which is laterally offset relative to the entrance (14) of the helical slot. The ring (18) is biased by a spring (24) toward the entrance of the socket (8). The second element has a stem (4) provided with a driving pin (6) which, in entering the helical slot, urges back the ring but is guided under the action of the spring (24) and the edges of the two slots toward the inner end of the helical slot and is then locked in this position without clearance.

7 Claims, 4 Drawing Sheets

RAPID FASTENER OF THE BAYONET TYPE

BACKGROUND OF THE INVENTION

The mechanical assembly of two parts or elements may be achieved in many various ways. One of the simplest ways which takes up the smallest amount of space is the use of a coupling of the bayonet type comprising on one of the elements a projecting pin, and on the end of the other element a socket having a slot for receiving and locking the pin.

Couplings of this type are well known and employed in many fields. However, they are reserved for the connection of elements intended to remain stationary since they can only ensure with difficulty the reliable transmission of a torque, above all if the latter is large.

For the purpose of ensuring an assembly of complete reliability, the most currently employed means are for example: collars, screw-and-nut systems or other systems. Their drawbacks are that they require precise moving operations and the application of well-determined clamping forces which create possible errors in the positioning.

SUMMARY OF THE INVENTION

An object of the present invention is to overcome these drawbacks and to provide a rapid fastener which, while having the advantages of a coupling of the bayonet type, ensures a connection with no axial or angular clearance permitting, on one hand, the transmission of even large torques and, on the other hand, the establishment of the connection by a single shifting and being capable of being disassembled at any moment.

The invention indeed provides a rapid fastener of the bayonet type comprising, on one hand, a female socket having at least one helical slot and, on the other hand, a male stem carrying at least one laterally projecting pin capable of being disposed in the slot of the socket, and guiding and locking means carried by the socket and elastically biasing the pin into the bottom of the helical slot and locking the pin in this position.

According to a preferred embodiment, the guiding and locking means comprise a ring mounted to be axially slidable along the socket but biased toward the open end of the sockket by a spring, said ring comprising in facing relation to each of the helical slots of the socket an open longitudinal slot which is laterally offset relative to the entrance of the helical slot.

With this arrangmeent, a mere axial force exerted on either of the elements to be interconnected constrains each of the driving pins to urge back the slidable ring so as to enter the helical slot and then, under the combined action of the edges of the two slots, to effect the angular displacement required for the locking thereof and the return of the ring to the locking position. The two elements are then assembled in a sure manner and with no angular clearance and are capable of transmitting torques in either direction whatever be the magnitude thereof.

The following description of an embodiment given by way of a non-limitative example and shown in the accompanying drawings will being out the advantages and features of the invention.

In the drawings:

DETAILED DESCRIPTION OF PREFERRED EMBODIMENTS

Figure 1:
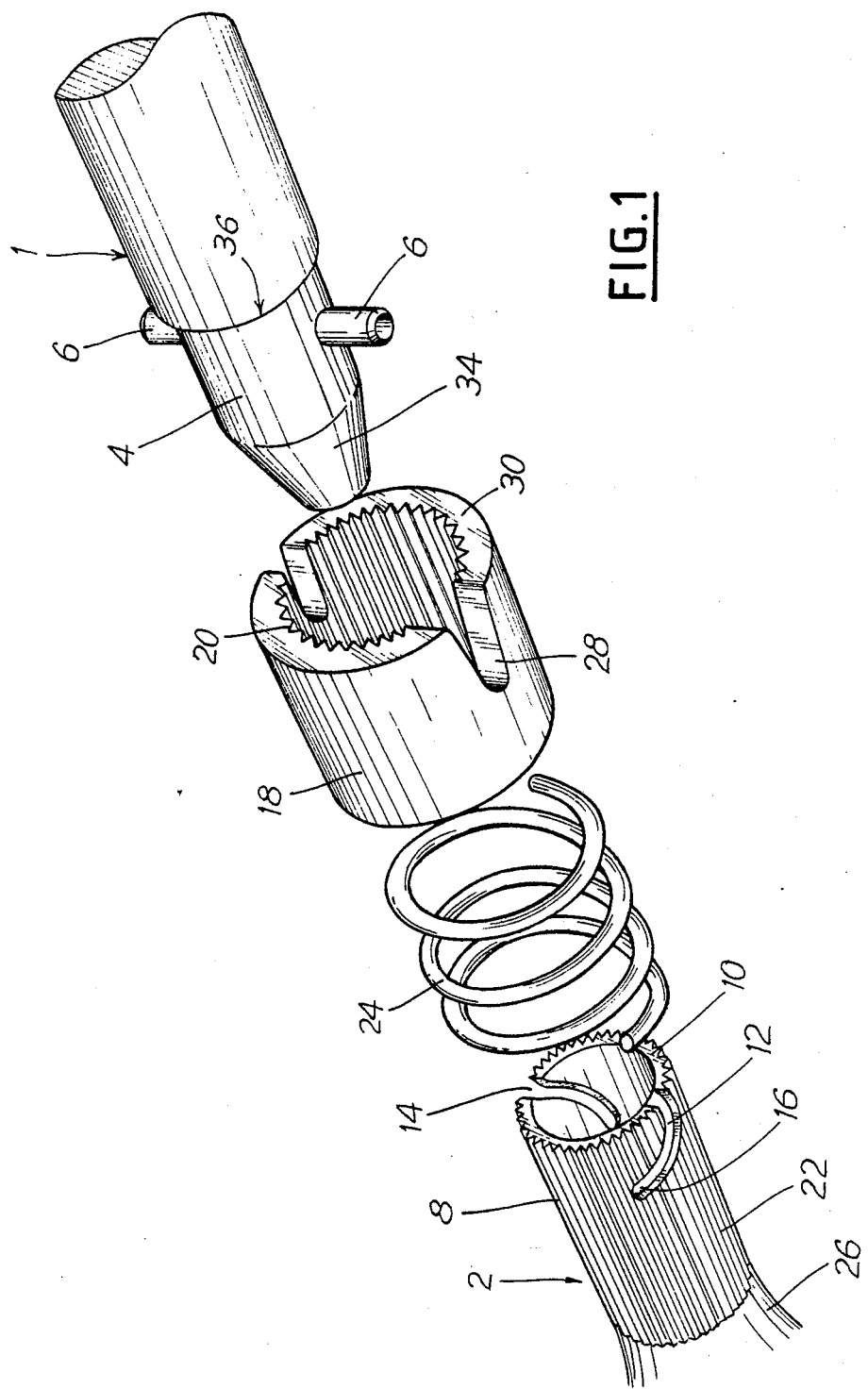
FIG. 1 is an exploded perspective view of a rapid fastener according to the invention.

The rapid fastener according to the invention is adapted to interconnect two elements, and in particular two coaxial shafts 1 and 2, the shaft 1 of which has at its end an elongated stem 4 of substantially cylindrical shape which carries at least one driving pin 6 and preferably two pins, as shown in FIG. 1. The element 2 terminates in a hollow, also cylindrical, socket 8 which is open at its entrance end 10 and in the wall of which are provided two slots 12 each capable of receiving one of the pins 6.

Each of the slots 12 has a curved shape, i.e. it includes, following on a substantially axial entrance portion 14, a substantially helical portion 16.

Slidably mounted on the socket 8 is a ring 18 which is connected to rotate with the socket by any suitable means, such as flat faces, a polygonal shape or, as shown, longitudinal splines 20 provided on its inner surface and cooperating with complementary splines 22 on the outer surface of the socket 8. A coil spring 24 is also mounted around the socket 8. It bears, on one hand, against the edge of the slidable ring 18, and, on the other hand against an outer shoulder or a projection 26 on the element 2 so that it tends to bias the ring 18 outwardly, i.e. in the direction toward the open end 10 of the socket 8.

The ring 18 further comprises two slots 28 extending generally longitudinally and open at the end of the ring which is remote from the spring 24. Each of the slots 28 has sufficient width to permit the entry of the pin 6 of the element 1. Preferably, these slots 28 have a divergent shape, their width increasing progressively in the direction toward their open end (FIG. 1.).

Figure 2:
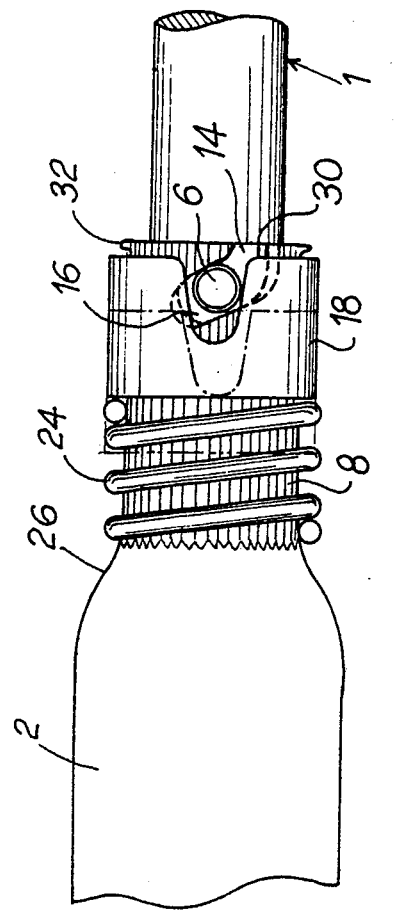
FIG. 2 is an elevational view of the assembled rapid fastener.

As is shown more particularly in FIG. 2, each of the slots 28 is disposed on top of one of the slots 12 of the socket 8, but is laterally offset relative to the entrance 14 of the slot 12 so that the end edge 30 of the ring 18 partly closes this entrance of the slot 12.

One or more lugs 32 formed for example by a press operation or by a forming-over operation on the material of the socket 8, after the mounting of the ring 18, retain this ring on the socket. At rest, i.e. before the assembly of the rapid fastener, the ring 18 is thus biased by the spring 24 against the lugs 32 in a well-determined angular position.

When it is desired to achieve the connection between the elements 1 and 2, it is sufficient to introduce the elongated stem 4 inside the socket 8 in placing each of the pins 6 in front of the entrance 14 of one of the slots 12. An axial force on either of the elements 1 and 2 then enables the pin 6 to urge back the edge 30 of the ring 18 against the action of the spring 24 and thus to enter the slot 12. However, owing to the force exerted by the spring 24 and the inclination of the lower edge of the portion 16 of the slot 12, the pin 6 is progressively laterally urged back by the edge of the slot 28 so that, as it axially advances in the socket, it is angularly displaced relative to the entrance of the slot 12 and approaches the inner end of the latter. It then slides along the oppopsed edges of the two slots and thereby enables the ring 18 to progressivley resume its initial position. At this moment, as shown clearly in FIG. 2, the pin 6 is trapped between edges of the slots 12 and 28 so that at any moment the return movement thereof is precluded.

Preferably, an outer shoulder 36 is formed at the junction between the element 1 proper and the stem 4 and the abutment of this shoulder against the edge 10 of the socket 8 corresponds to the locking position, which facilitates the positioning of the fastener.

The elements 1 and 2 are then closely locked together. Their axial displacement is precluded by the contact of the pin 6 with the edges of the slot 12 while their relative displacement in rotation is precluded by the contact of the pin 6 with the edges of the two slots 12 and 28. The interlocking of the elements 1 and 2 is without clearance, as the angular and/or axial clearances are automatically taken up by the compression spring, irrespective of the manufacturing tolerances and the wear of the assembly.

Such a connection is achieved by a simple axial force, the angular displacement occurring automatically under the effect of the exerted pressure. Furthermore, it does not require any precise handling, since a slight original offset of the pin 6 relative to the slot 12 is corrected automatically by a relative angular displacement of the two elements, while a larger offset preventing the connection is immediately detected, the two elements remaining independent. Thus, the slightest torque exerted on one of the elements confirms the locking or indicates its absence. The connection is therefore extremely reliable and safe.

This connection may also be very easily dismantled by urging the ring 18 against the action of the spring 24, which instantaneously releases the pins 6 and the element 1.

The rapid fastener is consequently most particularly adapted to the connection of elements which are difficult of access, or even to connections achieved automatically or remote controlled, whether the elements to be connected are solid or hollow, the stem 4 being if desired hollow.

Preferably, the positioning of the fastener is facilitated by the presence at the end of the stem 4 of a conical portion 34 which facilitates the centering and the entry in the socket 8.

It will be understood that the stem 4 and the inner surface of the socket 8 preferably have a cylindrical shape with a circular base, but they may have any other suitable profile. They may in particular have complementary prismatic profiles defining therebetween a sufficient clearance to permit the locking but ensuring a positive driving in the event of a breakage of the driving pin. Furthermore, the driving pins may have a cylindrical shape with a circular base, as shown, or have suitable slopes corresponding to the bearing against the edges of the slots so as to increase the contact surfaces.

It will be clearly apparent that the number of driving pins, helical slots and locking slots may vary in accordance with the utilization and the magnitude of the forces to be transmitted.

Figure 4:
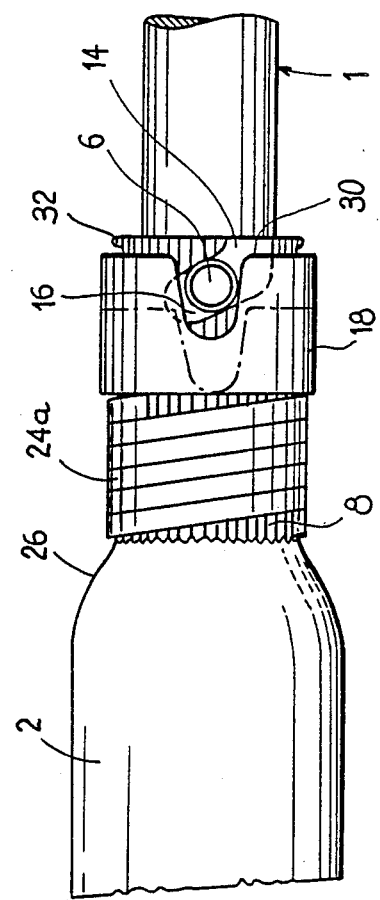
FIG. 4 is an elevational view of another variation of the assembled rapid fastener.

In some cases, moreover, it is advantageous to employ as a coil spring 24, a spring formed by a flat strip 24a (FIG. 4) wound into a helix, instead of a wire. The spring then forms around the socket a protective sheath against impurities or other exterior attack.

Figure 3:
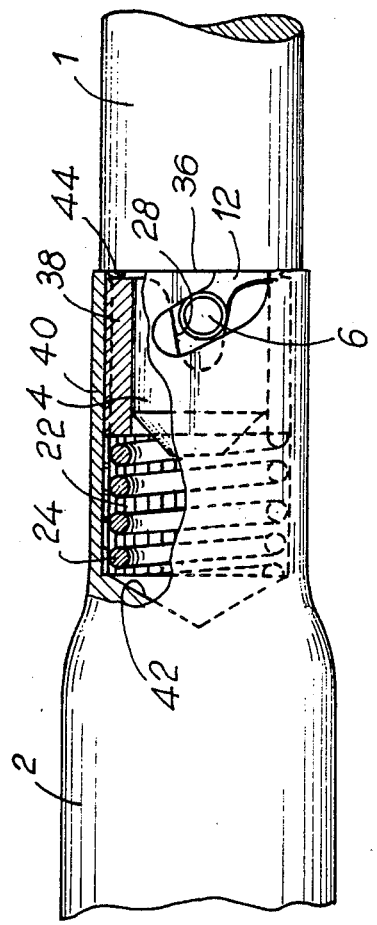
FIG. 3 is an elevational view of a modification of the assembled rapid fastener.

A still greater protection against impurities may be obtained by constructing the fastener according to the modification shown in FIG. 3. Indeed, in this case, the guiding and locking ring 38 is slidably mounted inside the socket 40 of the element 2. It is connected to rotate with the socket by splines 20, 22 or by any other suitable profile. A spring 24 is also disposed inside the socket between the inner end 42 of the inner bore of the socket and the ring 38. Radial lugs 44 formed at the open end of the socket 40 radially project inside the socket to prevent the ring 38 from moving out of the socket.

The ring 38 includes, as the ring 18, divergent longitudinal slots 28 which are laterally offset relative to the entrance 14 of each of the slots 12 of the socket 40.

The stem 4 of the element 1 has, in this case, a profile and dimensions which are complementary to those of the ring 38 in which it must penetrate.

The assembly is achieved in the same way as with the fastener shown in FIGS. 1 and 2. By inserting the stem 4 in the ring 38, the pins 6 are made to urge this ring back so as to enter the slots 12 and then the edges of the slots 28 of the ring urge back these pins 6 to the inner end of the slots 12 and lock them in this position.

As shown in FIG. 3, all the elements of the fastener are then protected and isolated from the exterior by the socket which abuts against the shoulder 36 of the element 1. They can be neither attacked nor damaged by exterior action.

What is claimed is:

1. A rapid fastener of the bayonet type for connection of two elements, comprising a socket terminating the first element, a stem terminating the second element, the socket having an open end for receiving a stem, a laterally projecting pin on the outer surface of said stem, a slot in the socket, said slot having an open entrance end for the entrance of said projecting pin, guiding and locking means comprising a ring axially slidable along the socket but rotating with said socket, spring means for biasing said ring toward the open end of said socket, a longitudinal slot formed in said ring and having an open end toward the open end of the socket, and two lateral walls progressively diverging toward said open end of the longitudinal slot; said longitudinal slot open end being laterally offset relative to said open entrance end of the socket slot and having an end edge which partly closes said entrance end of the socket slot and which is urged back by the pin as the stem penetrates in said socket, said socket slot having an helical shape which causes helical relative motion of said penetrating stem and said socket and guides the pin to the entrance end of the longitudinal slot so that the end edge of said longitudinal slot is released and the ring is biased to a locking position in which the pin is trapped by edges of the two slots.

2. A rapid fastener of the bayonet type for a connection of two elements, one of which elements terminates in a socket while the other of said elements comprises a stem, said fastener comprising a helical slot in the socket, a laterally projecting pin carried by the stem and capable of being disposed in the helical slot of the socket, guiding and locking means carried by the socket and elastically biasing the pin to an inner end of the helical slot and locking the pin at said end; and interengaged splines for connecting the guiding and locking means to rotate with the socket.

3. A rapid fastener of the bayonet type for a connection of two elements, one of which elements terminates in a socket while the other of said elements comprises a stem, said fastener comprising a helical slot in the socket, a laterally projecting pin carried by the stem and capable of being disposed in the helical slot of the socket and guiding and locking means carried by the socket and elastically biasing the pin to an inner end of the helical slot and locking the pin at said end; wherein the guiding and locking means comprise a ring slidably mounted on the socket; and further comprising a spring for biasing the ring toward the open end of the socket, said spring being in the form of a flat strip wound helically.

4. A rapid fastener according to claim 1, 2 or 3, wherein a plurality of said helical slot, a plurality of said pin and a plurality of said longitudinal slot are provided.

5. A rapid fastener according to claim 1, 2 or 3, wherein the socket comprises, in the vicinity of the open end thereof, radial lugs for retaining the slidable ring.

6. A rapid fastener according to claim 1 or 2, wherein the guiding and locking means comprise a ring slidably mounted on the socket.

7. A rapid fastener according to claim 1, 2 or 3, wherein the guiding and locking means comprise a ring slidably mounted inside the socket and means for elastically outwardly biasing the ring.

* * * * *